United States Patent
Lilburn et al.

(10) Patent No.: US 10,120,069 B2
(45) Date of Patent: Nov. 6, 2018

(54) MULTIPLE RANGES FOR PULSE COMPRESSION RADAR

(71) Applicant: Navico Holding AS, Egersund (NO)

(72) Inventors: Lindsay Lilburn, Auckland (NZ); Roger Phillips, Auckland (NZ); Ee Chen, Auckland (NZ)

(73) Assignee: NAVICO HOLDING AS, Egersund (NO)

( * ) Notice: Subject to any disclaimer, the term of this patent is extended or adjusted under 35 U.S.C. 154(b) by 577 days.

(21) Appl. No.: 14/829,577

(22) Filed: Aug. 18, 2015

(65) Prior Publication Data

US 2018/0074182 A1    Mar. 15, 2018

Related U.S. Application Data

(60) Provisional application No. 62/039,310, filed on Aug. 19, 2014.

(51) Int. Cl.
*G01S 13/30* (2006.01)
*G01S 13/28* (2006.01)
(Continued)

(52) U.S. Cl.
CPC ............ *G01S 13/30* (2013.01); *G01S 7/28* (2013.01); *G01S 7/282* (2013.01); *G01S 13/28* (2013.01);
(Continued)

(58) Field of Classification Search
CPC ........ G01S 13/30; G01S 13/28; G01S 13/282; G01S 13/32; G01S 7/28; G01S 7/282
See application file for complete search history.

(56) References Cited

U.S. PATENT DOCUMENTS 3,825,899 A * 7/1974 Haeberle .............. H04B 7/2125
370/324
4,021,805 A   5/1977 Effinger et al.
(Continued)

FOREIGN PATENT DOCUMENTS

CN       101464513 A    6/2009
EP       0 849 606 A1   6/1998
(Continued)

OTHER PUBLICATIONS

Simrad "Broadband 4Gr™ Radar." Simrad Marine Electronics, https://ww2.simrad-yachting.com/en-CA/Products/Radar/Broadband-4G-Radar-en-ca.aspx. retrieved Jan. 26, 2018.
(Continued)

*Primary Examiner* — Peter M Bythrow
(74) *Attorney, Agent, or Firm* — Nelson Mullins Riley & Scarborough LLP (57) ABSTRACT

Various implementations described herein are directed to multiple ranges for pulse compression radar. In one implementation, a method may include transmitting a first burst for a first range using a pulse compression radar system, where the first burst comprises one or more first pulse signals. The method may also include transmitting a second burst for a second range using the pulse compression radar system after transmitting the first burst, where the second burst comprises one or more second pulse signals. The method may further include repeating a transmission of the first burst using the pulse compression radar system after transmitting the second burst.

18 Claims, 6 Drawing Sheets

(51) Int. Cl.
*G01S 7/282* (2006.01)
*G01S 7/28* (2006.01)
*G01S 13/02* (2006.01)
*G01S 13/42* (2006.01)
*G01S 13/93* (2006.01)

(52) U.S. Cl.
CPC ......... *G01S 13/282* (2013.01); *G01S 13/0209* (2013.01); *G01S 13/42* (2013.01); *G01S 13/9307* (2013.01)

(56) References Cited

U.S. PATENT DOCUMENTS

| | | | |
|---|---|---|---|
| 4,028,700 A | | 6/1977 | Carey et al. |
| 4,047,173 A | | 9/1977 | Miller |
| 4,114,154 A | | 9/1978 | Sarfati |
| 4,136,341 A | * | 1/1979 | Mulder ................. G01S 7/2813 342/160 |
| 4,211,485 A | | 7/1980 | Koreicho |
| 4,216,474 A | | 8/1980 | Levine |
| 4,243,988 A | | 1/1981 | Kang et al. |
| 4,328,495 A | | 5/1982 | Thue |
| 4,353,067 A | * | 10/1982 | Mims ..................... G01S 13/284 342/189 |
| 4,566,010 A | | 1/1986 | Collins |
| 4,626,853 A | | 12/1986 | Lee et al. |
| 4,686,534 A | | 8/1987 | Eddy |
| 4,772,889 A | | 9/1988 | Elleaume |
| 4,800,388 A | | 1/1989 | Okada |
| 4,851,848 A | * | 7/1989 | Wehner ................... G01S 13/24 342/179 |
| 4,929,954 A | | 5/1990 | Elleaume |
| 4,983,979 A | * | 1/1991 | McKenzie ............ G01S 13/284 342/131 |
| 4,989,010 A | | 1/1991 | Crevoulin et al. |
| 5,003,313 A | | 3/1991 | Doriath |
| 5,128,681 A | | 7/1992 | McGroary et al. |
| 5,141,308 A | | 8/1992 | Danckwerth et al. |
| 5,151,702 A | * | 9/1992 | Urkowitz ............... G01S 13/284 342/116 |
| 5,173,706 A | | 12/1992 | Urkowitz |
| 5,227,801 A | | 7/1993 | Pierce |
| 5,309,161 A | | 5/1994 | Urkowitz et al. |
| 5,389,933 A | | 2/1995 | Golinsky |
| 5,414,428 A | * | 5/1995 | Gallagher ............. G01S 13/284 342/111 |
| 5,481,270 A | * | 1/1996 | Urkowitz ................. G01S 13/28 342/101 |
| 5,530,448 A | * | 6/1996 | Lewis ..................... G01S 13/282 342/132 |
| 5,943,004 A | * | 8/1999 | Groenenboom ........ G01S 13/24 342/128 |
| 5,977,905 A | * | 11/1999 | Le Chevalier .......... G01S 13/53 342/110 |
| 5,997,905 A | | 11/1999 | Le Chevalier |
| 6,067,043 A | | 5/2000 | Faure et al. |
| 6,377,204 B1 | * | 4/2002 | Wurman ................ G01S 13/003 342/59 |
| 7,019,686 B2 | | 3/2006 | Hester et al. |
| 7,081,846 B1 | | 7/2006 | Sparrow et al. |
| 7,106,250 B2 | | 9/2006 | Blunt et al. |
| 7,675,458 B2 | * | 3/2010 | Hubbard ............. G01S 13/5246 342/159 |
| 7,688,257 B1 | | 3/2010 | Christianson et al. |
| 7,764,223 B2 | * | 7/2010 | Wade ........................ G01S 7/28 342/107 |
| 8,022,863 B1 | | 9/2011 | Nuthalapati |
| 8,232,907 B2 | * | 7/2012 | Aarseth ............... G01S 13/9035 342/132 |
| 9,194,946 B1 | * | 11/2015 | Vacanti .................... G01S 13/28 |
| 2004/0027274 A1 | | 2/2004 | Driessen et al. |
| 2005/0179585 A1 | * | 8/2005 | Walker ................ G01S 13/0209 342/134 |
| 2008/0018526 A1 | * | 1/2008 | Wade ........................ G01S 7/28 342/204 |
| 2008/0111734 A1 | | 5/2008 | Fam et al. |
| 2008/0316086 A1 | * | 12/2008 | Hoctor .................... G01S 7/288 342/137 |
| 2009/0079620 A1 | * | 3/2009 | Van Caekenberghe ... G01S 7/03 342/200 |
| 2009/0121920 A1 | | 5/2009 | Mullarkey et al. |
| 2011/0279307 A1 | * | 11/2011 | Song ....................... G01S 7/292 342/132 |
| 2012/0262332 A1 | | 10/2012 | Ohnishi |
| 2012/0293361 A1 | | 11/2012 | Mowbray et al. |
| 2013/0099959 A1 | * | 4/2013 | Matsuo ................... G01S 7/282 342/189 |
| 2013/0135140 A1 | * | 5/2013 | Kishigami ............... G01S 7/282 342/189 |
| 2014/0341137 A1 | | 11/2014 | Crowle et al. |
| 2016/0054432 A1 | | 2/2016 | Lilburn et al. |
| 2016/0054437 A1 | * | 2/2016 | Lilburn .................... G01S 7/282 342/21 |
| 2016/0259041 A1 | | 9/2016 | Tan et al. |

FOREIGN PATENT DOCUMENTS

| | | |
|---|---|---|
| EP | 2 805 425 B1 | 7/2015 |
| JP | 2982769 B2 | 11/1999 |
| JP | 2009-128278 A | 6/2009 |

OTHER PUBLICATIONS

Furuno "24 Radome Radar Sensor DRS4D" Marine Radar Products, http://www.furuno.com/en/products/radar/DRS4D. Retrieved Jan. 26, 2018.

\* cited by examiner

MULTIPLE RANGES FOR PULSE COMPRESSION RADAR

CROSS-REFERENCE TO RELATED APPLICATIONS

This application claims the benefit of U.S. Provisional Patent Application Ser. No. 62/039,310, filed Aug. 19, 2014, titled MULTI-RANGE FOR PULSE COMPRESSION RADAR, and the disclosure of which is incorporated herein by reference.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

A radar system may be used in a number of scenarios. For example, a radar system may be used by an operator on board a vessel to safely navigate through a marine environment. In particular, the radar system may be used to track neighboring vessels and obstacles for the purposes of collision avoidance, weather detection, situational awareness, and/or the like.

Further, with a single range radar system, the system may be able to track neighboring vessels and obstacles that are located within a specified range of the vessel, where only one range may be specified at a time. To track neighboring vessels and obstacles that are located within a different range, the operator has to change radar control settings to re-optimize the single range radar system for the different range. Particular functions (e.g., collision avoidance, weather detection, etc.) for the radar system may each be performed optimally at a different range, thereby causing the operator to frequently change the radar control settings if performing more than one of these functions at a time. This frequent changing of the radar control settings can be distracting to the operator when operating the vessel.

SUMMARY

Described herein are implementations of various technologies relating to multiple ranges for pulse compression radar. In one implementation, a method may include transmitting a first burst for a first range using a pulse compression radar system, where the first burst comprises one or more first pulse signals. The method may also include transmitting a second burst for a second range using the pulse compression radar system after transmitting the first burst, where the second burst comprises one or more second pulse signals. The method may further include repeating a transmission of the first burst using the pulse compression radar system after transmitting the second burst.

In another implementation, a pulse compression radar system may include a digital signal processor and an antenna. The antenna may be configured to transmit a first burst for a first range, where the first burst comprises one or more first pulse signals. The antenna may also be configured to transmit a second burst for a second range, where the second burst comprises one or more second pulse signals. The antenna may be further configured to repeat a transmission of the first burst after transmitting the second burst.

In yet another implementation, a method may include transmitting a first burst for a first range using a pulse compression radar system, where the first burst comprises one or more first pulse signals. The method may also include transmitting a second burst for a second range using the pulse compression radar system after transmitting the first burst, where the second burst comprises one or more second pulse signals. The method may further include transmitting a third burst for a third range using the pulse compression radar system after transmitting the second burst, where the third burst comprises one or more third pulse signals. The method may additionally include repeating transmissions of the first burst, the second burst, and the third burst using the pulse compression radar system after transmitting the third burst.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Various implementations directed to multiple ranges for pulse compression radar will now be described in the following paragraphs with reference to FIGS. 1-6.

As noted above, a radar system may be used in a number of purposes. For example, a radar system may be used by an operator on board a vessel to safely navigate through a marine environment. In particular, the radar system may be used to track neighboring vessels and obstacles for the purposes of collision avoidance, weather detection, situational awareness, and/or the like A pulse compression radar system capable of transmitting signals for multiple ranges may be used. Such a system may hereinafter be referred to as a multi-range pulse compression radar system. The multi-range pulse compression radar system may determine the distance of one or more objects by transmitting one or more radar signals to an area proximate to the system, receiving a reflected signal, and determining a time delay between the received signal and the transmitted signal. In particular, the multi-range pulse compression radar system may initially transmit a radar signal. If there is an object in the direction of the transmitted signal, then the transmitted signal may reflect or echo off of the object. After the transmitted signal is reflected, the multi-range pulse compression radar system may then receive the reflected signal.

The multi-range pulse compression radar system may determine the distance of the object by determining a time delay between the reflected signal and the transmitted signal. The signals that are transmitted and reflected are known to travel at the speed of light, c. If the time delay between the reflected signal and the transmitted signal is designated as t, then the distance that the signal has traveled is equal to the product of c and t. Since the signal makes a round-trip, the position of the detected object relative to the multi-range pulse compression radar system may be equal to half of the distance that the signal has traveled, or ct/2.

Bursts

Figure 1:
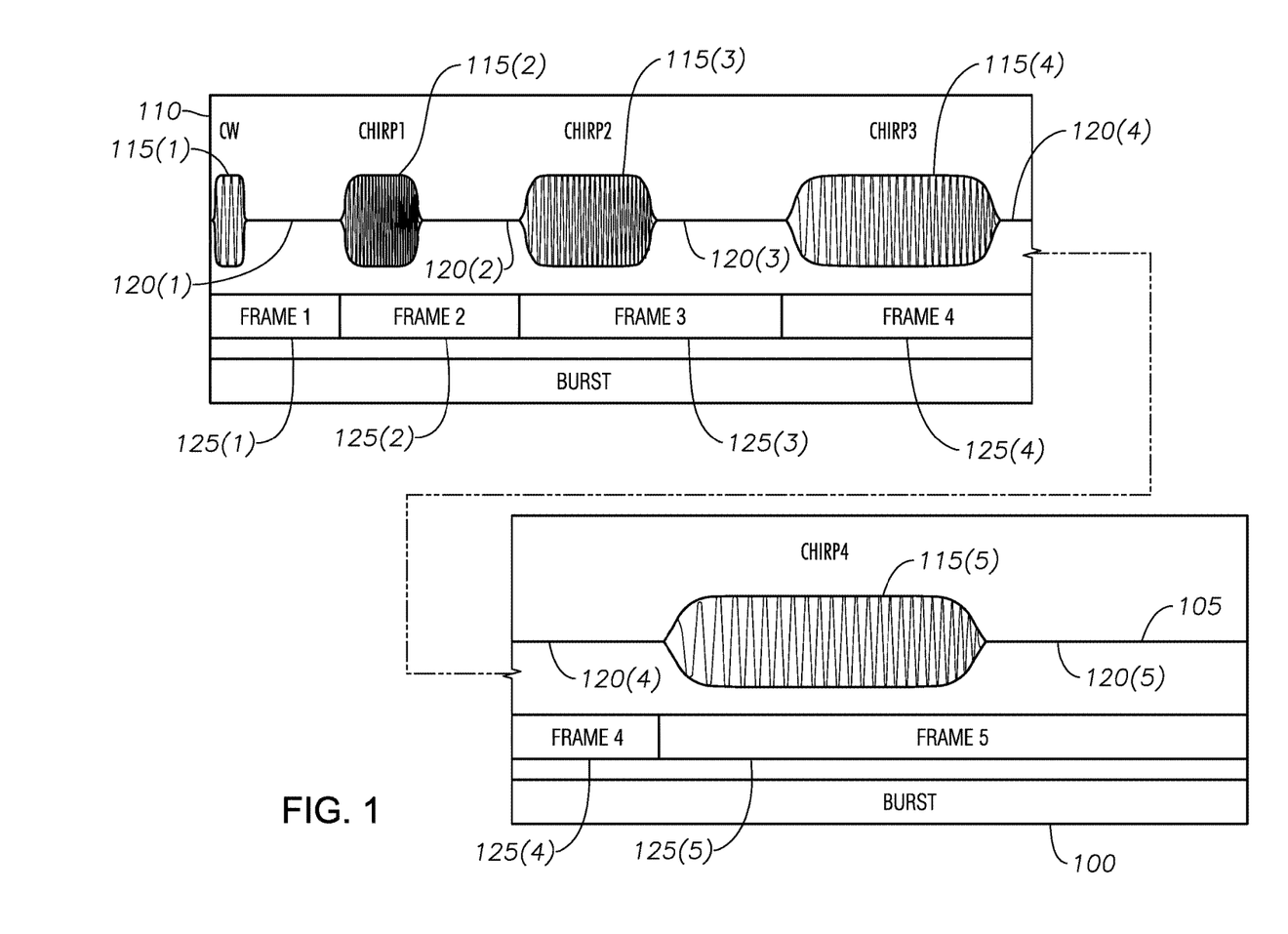
FIG. 1 is a graphical representation of a burst in accordance with techniques described herein.

In one implementation, the one or more radar signals may be in the form of one or more bursts. A burst may be a baseband radar signal that includes a succession of selectable pulse signals that cover a particular area. For purposes of this document, "radio transmits" or "radio transmitting" will hereinafter refer to transmitting a carrier frequency radar signal modulated by one or more bursts. FIG. 1 is a graphical representation of a burst 100 in accordance with techniques described herein. The horizontal axis 105 may represent time, whereas the vertical axis 110 may represent amplitude.

The burst 100 may be composed of one or more pulse signals 115(1) to 115(5), where each pulse signal may have a different length and/or bandwidth. In one implementation, the pulse signals 115(1) to 115(5) may increase in length with respect one another over time, such that the pulse signal 115(1) has the shortest length and the pulse signal 115(5) has the longest length. The variation in length and/or bandwidth may allow the multi-range pulse compression radar system to simultaneously satisfy certain desired target distances and energy on target levels. In particular, the shorter pulse signals may allow for the detection of shorter distance targets, whereas the longer pulse signals may allow for the detection of longer distance targets. Further, the pulse signals 115(1) to 115(5) may be composed of continuous wave signals and/or chirp signals. A chirp signal is a signal with a frequency that increases or decreases over a period of time, linearly, exponentially or in any one of a variety of other ways. As shown in FIG. 1, the pulse signal 115(1) is a continuous wave signal, while the pulse signals 115(2) to 115(5) are chirp signals of increasing length and frequency.

The burst 100 may also include a time delay between each pulse signal to allow for reception of the reflected pulse signal. As shown in FIG. 1, time delays 120(1) to 120(5) may be disposed between the pulse signals 115(1) to 115(5). In some implementations, multiple bursts 100 may be used in order to assist with Doppler processing. In particular, a Doppler shift may be measured on a burst-to-burst basis. In such implementations, a burst rate may be higher than 2 kilohertz (kHz) to obtain a substantially unambiguous velocity range for a marine environment.

As shown in FIG. 1, each pulse signal 115(1) to 115(5) may be paired with a respective time delay 120(1) to 120(5) to form transmission frames 125(1) to 125(5). A burst can include any combination of the transmission frames 125(1) to 125(5). In the burst 100, the transmission frame 125(1) with its relatively short pulse signal 115(1) may be used to detect shorter distance targets, progressing through to the transmission frame 125(5) with its relatively long pulse signal 115(5) being used to detect longer distance targets. In another implementation, one or more transmission frames 125 may be repeated within the burst 100 in order to track high velocity targets.

Multiple Ranges

As noted above, the multi-range pulse compression radar system may be configured to transmit one or more bursts for a plurality of ranges proximate to the system, where a unique burst can be used for each range. A range is an area within a predetermined distance from the multi-range pulse compression radar system. For example, a short range can include an area within a relatively short distance from the multi-range pulse compression radar system. A medium range can include an area within a distance that is farther than the short distance from the multi-range pulse compression radar system. A long range can include an area having a distance that is relatively far from the multi-range pulse compression radar system.

The multiple ranges at which the multi-range pulse compression radar system operates may be selected in various ways. In one implementation, the multi-range pulse compression radar system can receive selected multiple range values through a user input device, such as those discussed below with respect to FIG. 6. A user input device can include, but is not limited to, a keyboard, a touch or heat sensitive display screen, a mouse, a knob, a switch, a button, and/or the like. In other implementations, the multiple ranges can be predetermined or may be selected by another device.

Thus, the multi-range pulse compression radar system may provide radar coverage for multiple selected ranges using a unique burst for each range. For each unique burst for a particular selected range, only the transmission frames 125 (with their associated pulse signals) needed to cover the selected range may be transmitted by the system. In particular, the longer the range that needs radar coverage by the system, the more transmission frames 125 may be included in the unique burst for the range. Therefore, each one of the multiple ranges can be associated with a unique burst, where each unique burst may include a unique combination of the transmission frames 125.

Further, the system may radio transmit the unique bursts in alternating (if two ranges) or round-robin (if three or more) fashion, as further described below with respect to FIGS. 2-3. Accordingly, by constructing a unique burst for each selected range, and by transmitting the unique bursts in alternating or round-robin fashion, the multi-range pulse compression radar may cover multiple ranges.

Figure 2:
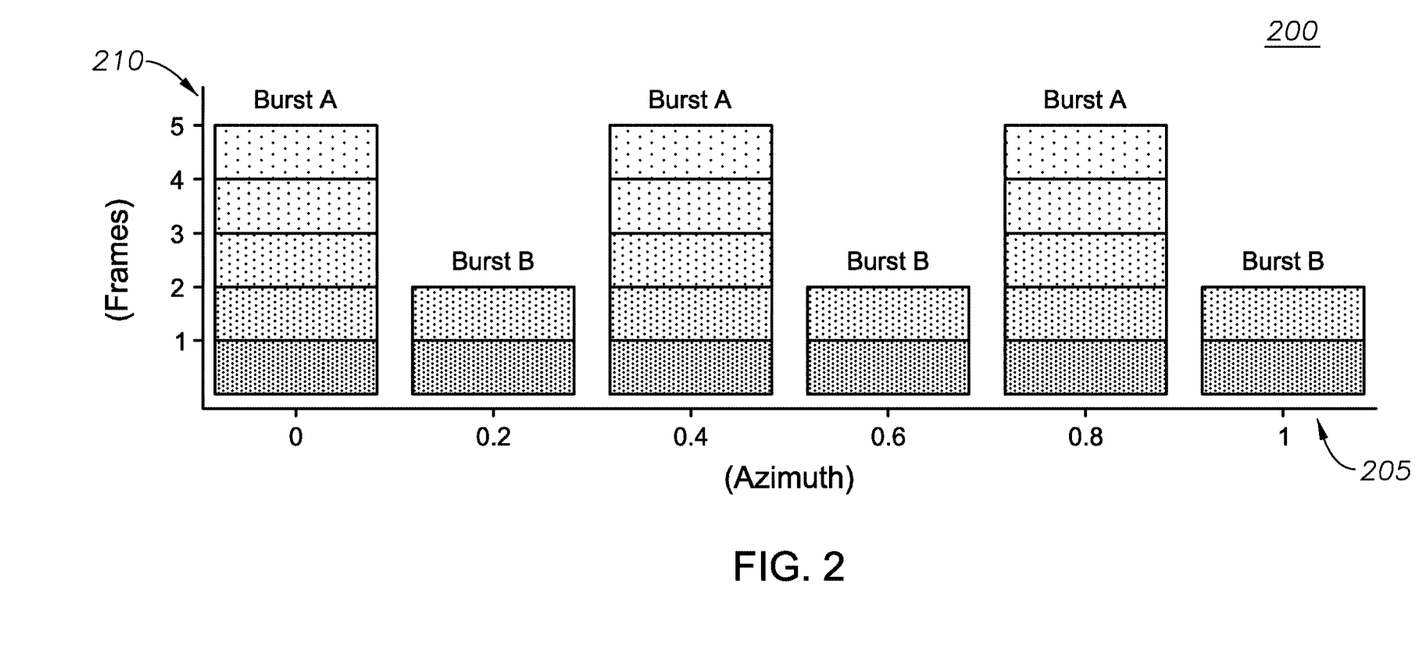
FIG. 2 illustrates a pictorial representation of alternating bursts that are radio transmitted by a multi-range pulse compression radar system in accordance with the techniques described herein.

FIG. 2 illustrates a pictorial representation 200 of alternating bursts that are radio transmitted by a multi-range pulse compression radar system in accordance with the techniques described herein. As shown, a burst A and a burst B are transmitted by the system in alternating fashion. In one implementation, the burst A and the burst B may be similarly constructed like burst 100 as discussed above. In another implementation, the burst A and the burst B may be transmitted continuously in alternating fashion by the multi-range pulse compression radar system. In particular, the burst A and the burst B may be transmitted continuously in alternating fashion without the need for additional input by an operator. Further, the transmissions of each burst may be independently controlled.

As shown, a horizontal axis 205 of the pictorial representation 200 may represent azimuth angle values (described in greater detail below) at which an antenna of the multi-range pulse compression radar system (discussed below) transmits each burst. The vertical axis 210 may represent a number of transmission frames (e.g., transmission frames 125) that are transmitted with each burst.

The multi-range pulse compression radar system may be used to cover a range A and a range B, where range A may be long range and range B may be short range. As shown, the multi-range pulse compression radar system may use the burst A to cover the range A, where the burst A includes five transmission frames (e.g., transmission frames 125(1) to 125(5)). In such an implementation, five transmission frames may be the minimum needed to cover the range A. Similarly, the multi-range pulse compression radar system may use the burst B to cover the range B, where the burst B includes two transmission frames (e.g., transmission frames 125(1) to 125(2)). In such an implementation, two transmission frames may be the minimum needed to cover the range B.

At azimuth angles 0, 0.4, and 0.8 degrees, the multi-range pulse compression radar system may radio transmit burst A (i.e., the five transmission frames) to cover range A. At azimuth angles 0.2, 0.6, and 1 degree, the multi-range pulse compression radar system may radio transmit burst B (i.e., the two transmission frames) to cover range B. Thus as shown, the multi-range pulse compression radar system may be configured to provide radar coverage for ranges A and B by transmitting unique bursts for each range in an alternating fashion.

Figure 3:
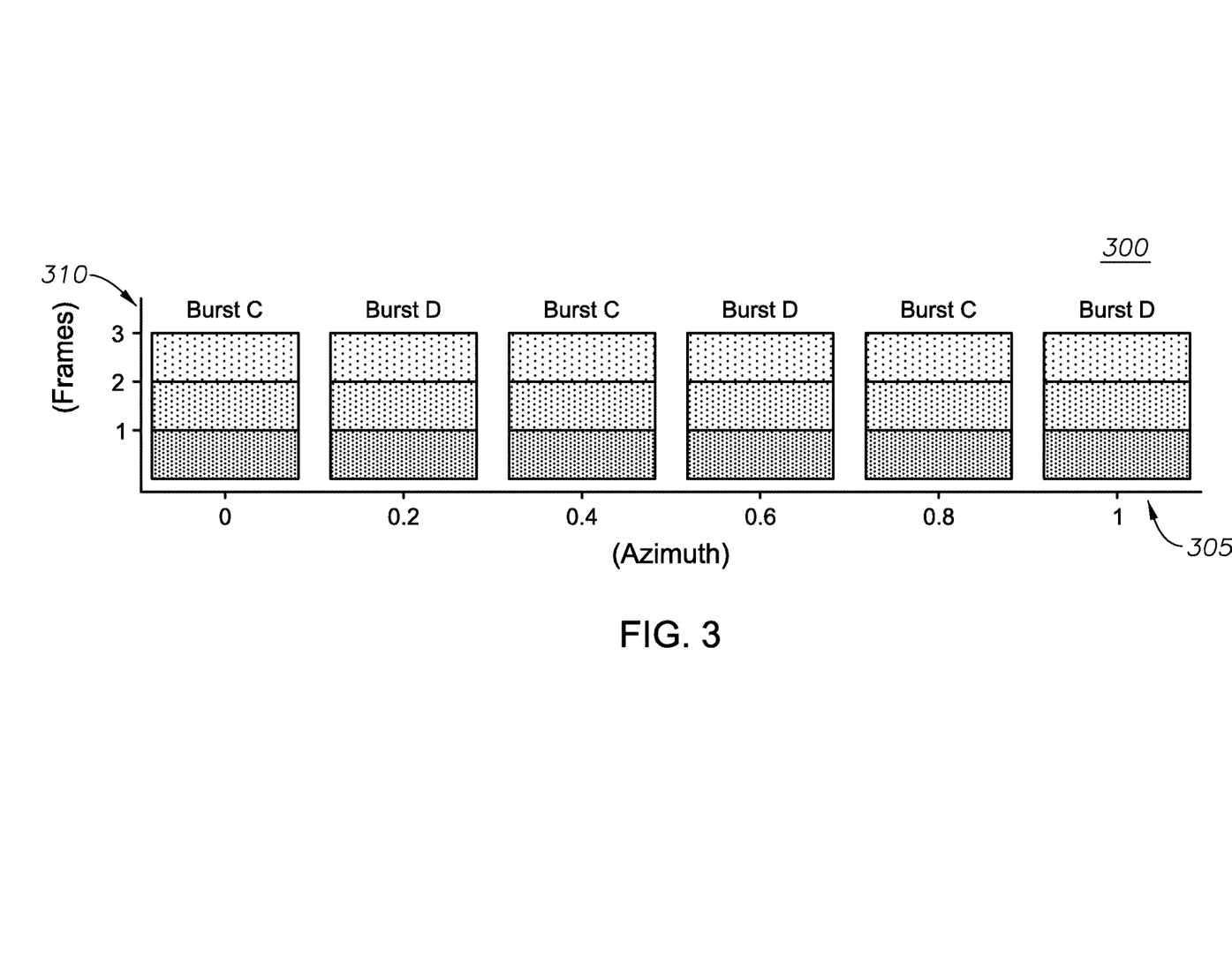
FIG. 3 illustrates a pictorial representation of alternating bursts that are radio transmitted by a multi-range pulse compression radar system in accordance with the techniques described herein.

FIG. 3 illustrates a pictorial representation 300 of alternating bursts that are radio transmitted by a multi-range pulse compression radar system in accordance with the techniques described herein. Similar to FIG. 2, a burst C and a burst D are transmitted by the system in alternating fashion. In one implementation, the burst C and the burst D may be similarly constructed like burst 100 as discussed above. In another implementation, the burst C and the burst D may be transmitted continuously in alternating fashion by the multi-range pulse compression radar system. In particular, the burst C and the burst D may be transmitted continuously in alternating fashion without the need for additional input by an operator. Further, the transmissions of each burst may be independently controlled.

As shown, a horizontal axis 305 of the pictorial representation 300 may represent azimuth angle values (described in greater detail below) at which an antenna of the multi-range pulse compression radar system transmits each burst. The vertical axis 310 may represent a number of transmission frames (e.g., transmission frames 125) that are transmitted with each burst.

The multi-range pulse compression radar system may be used to cover a range C and a range D, where range C and range D are both similarly medium ranged. As shown, the multi-range pulse compression radar system may use the burst C to cover the range C, where the burst C includes three transmission frames (e.g., transmission frames 125(1) to 125(3)). In such an implementation, three transmission frames may be the minimum needed to cover the range C. Similarly, the multi-range pulse compression radar system may use the burst D to cover the range D, where the burst D also includes three transmission frames (e.g., transmission frames 125(1) to 125(3)). In such an implementation, three transmission frames may be the minimum needed to cover the range D.

At azimuth angles 0, 0.4, and 0.8 degrees, the multi-range pulse compression radar system may radio transmit burst C (i.e., the three transmission frames) to cover range C. At azimuth angles 0.2, 0.6, and 1 degree, the multi-range pulse compression radar system may radio transmit burst D (i.e., the three transmission frames) to cover range D. Thus as shown, the multi-range pulse compression radar system may be configured to provide radar coverage for medium ranges C and D by transmitting unique bursts for each range in an alternating fashion.

In other implementations, and as mentioned above, the multi-range pulse compression radar system may radio transmit three or more bursts in a round-robin fashion. For example, the system may radio transmit burst A, burst B, and burst C in a round-robin fashion in order to provide radar coverage range A, range B, and range C, respectively. In such implementations, the bursts may be transmitted continuously. Further, by transmitting in a round-robin fashion, the bursts may be transmitted in the order of burst A, then burst B, and then burst C in a continuous fashion. In particular, the bursts may be transmitted continuously in a round-robin fashion without the need for additional input by an operator. Further, the bursts may be transmitted by the multi-range pulse compression radar system in any pattern or in any randomized manner within a dwell count. A dwell count is equal to the number of bursts transmitted for a stationary point target during the time that a rotating antenna beam illuminates the target. Thus, for example, the multi-range pulse compression radar system may radio transmit bursts A, B, and C in one order and then radio transmit bursts A, B, and C in a different order.

As mentioned above, the multi-range pulse compression radar system may determine the distance of one or more objects in multiple ranges by transmitting the bursts to an area proximate to the system and receiving the reflected bursts, where the reflected bursts are used for further processing by the multi-range pulse compression radar system. The multi-range pulse compression radar system is discussed in greater detail below with respect to FIG. 4.

Radar System

Figure 4:
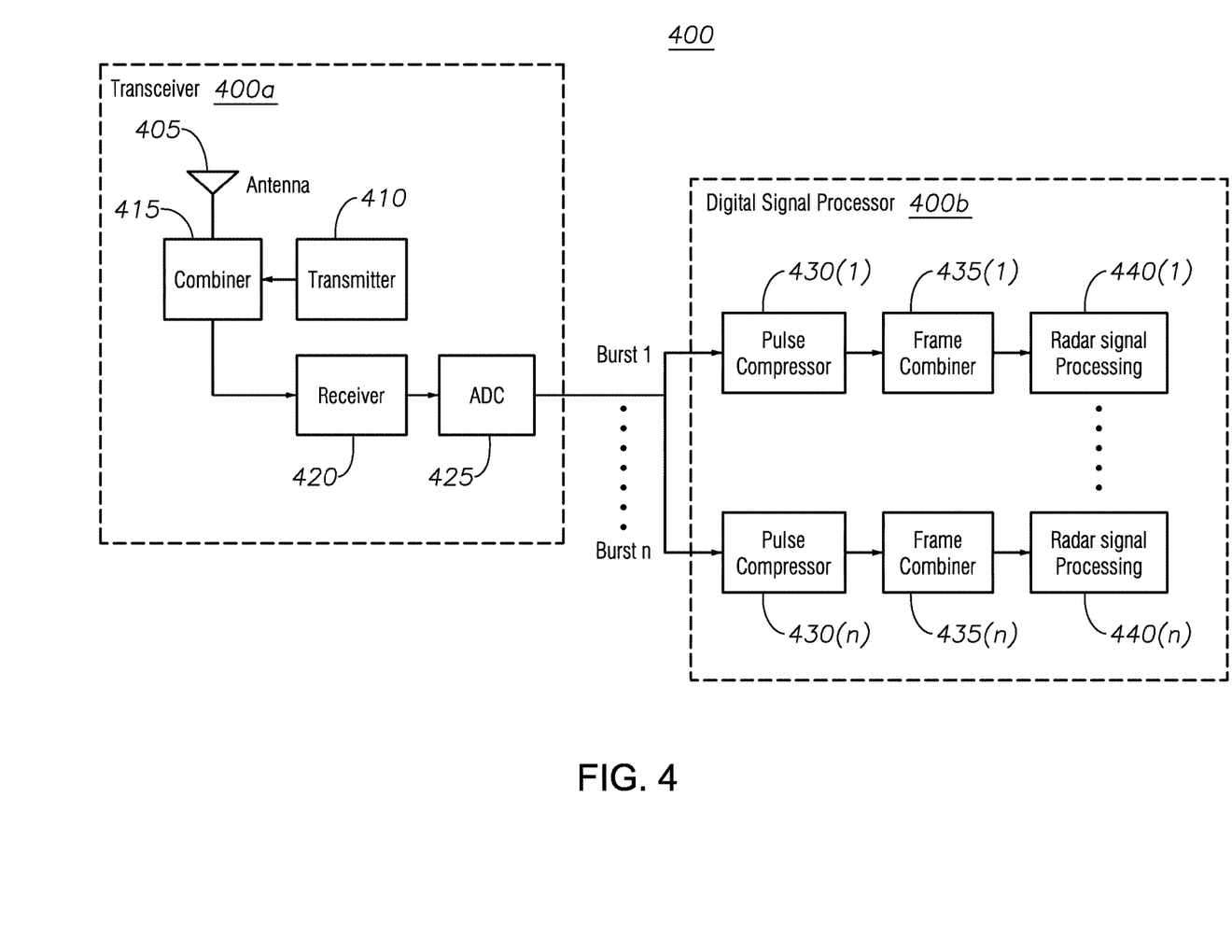
FIG. 4 illustrates a block diagram of a multi-range pulse compression radar system in accordance with techniques described herein.

FIG. 4 illustrates a block diagram of a multi-range pulse compression radar system 400 in accordance with techniques described herein. The multi-range pulse compression radar system 400 may include a transceiver section 400a and a digital signal processor 400b. The transceiver section 400a may transmit and receive signals (i.e., bursts) as described above. The digital signal processor 400b may determine the distance of one or more objects in an area proximate to the multi-range pulse compression radar system 400, such as by determining the time delay between transmitted signals and the received signals as described above.

In one implementation, the transceiver section 400a may include an antenna 405, a transmitter 410, a combiner 415, a receiver 420, and an analog to digital converter (ADC) 425. The antenna 405 may radio transmit the bursts and may receive reflected signals. In certain implementations, the antenna 405 may include a directional antenna that transmits and receives radio signals in a particular direction, known as the azimuth angle. The azimuth angle is measured in degrees. By rotating the directional antenna, and transmitting and receiving radio signals at various intervals over 360 degrees, objects in the multiple ranges can be detected in all directions.

The transmitter 410 may prepare and/or construct the bursts for radio transmission. Since the burst and reflected signal may include time varying frequencies, the combiner 415 between the transmitter 410 and the antenna 405 may allow for transmission and reception of multiple frequencies. The receiver 420 may receive the reflected signal via the antenna 405, demodulate the reflected signal to recover a baseband signal (now referred to as the "received signal"), and provide the received signal to the ADC 425. The receiver may alternatively convert the reflected signal to an intermediate frequency that may be sampled or sub-sampled by the ADC 425 with the final conversion to baseband being performed by well-known digital methods. The ADC 425 may digitize the received signal at a constant sampling rate (now referred to as the "digital domain"). For purposes of this document, "received signal" will refer to both the analog received signal and the digitized received signal.

In another implementation, the digital signal processor 400*b* may process the received signals for each of the ranges. As noted above, the multi-range pulse compression radar 400 may provide radar coverage for each range by transmitting a unique burst for each of the multiple ranges. The digital signal processor 400*b* may process any received signal(s) for each unique burst. The digital signal processor 400*b* may include a separate pulse compressor 430(1 . . . n), frame combiner 435(1 . . . n), and additional radar signal processing circuitry 440(1 . . . n) for each one of an n number of unique bursts. In particular, the received signal(s) for each unique burst may be processed using a particular processing pipeline of the digital signal processor 400*b*, where n processing pipelines may be used. Each processing pipeline may include a respective pulse compressor 430, frame combiner 435, and additional radar signal processing circuitry 440.

The pulse compressors 430(1 . . . n) may perform a pulse compression on a particular unique burst, as is known to those skilled in the art. In one implementation, the pulse compressors 430(1 . . . n) may each be in the form of a correlator. In such an implementation, the pulse compressors 430(1 . . . n) may use a process known as correlation to compare the received signal for a particular range to the unique burst for that range. The output of each pulse compressor 430(1 . . . n) may be known as a compressed signal. The compressed signal may indicate the time lapses between the unique burst for the range and the received signal for the range. Since a unique burst is transmitted for each of the different ranges, each pulse compressor 430(1 . . . n) may correlate the received signal for a particular range to the unique burst for that range.

Each compressed signal for a range may be provided to a different frame combiner 435(1 . . . n). As noted above, the compressed signal may be the result of the correlation of the unique burst for a range with the received signal for the range. Since a burst can include any combination of transmission frames 125(1) to 125(5), the compressed signal may be the result of the correlation of the transmission frames 125 forming the unique burst with the received signals. Each frame combiner 435(1 . . . n) may combine the compressed signal for each of the transmission frames 125 to form one contiguous dataset covering a particular range. Each frame combiner 435(1 . . . n) may output a signal to additional radar signal processing circuitry 440(1 . . . n), where the additional radar signal processing circuitry 440 may include one or more circuitry components known to those skilled in the art. For example, the additional radar signal processing circuitry 440 may be used to determine the distance of one or more objects proximate to the system 400.

In some implementations, the multi-range pulse compression radar system 400 may have Doppler processing capability. In such an implementation, dual range (two selected ranges) may be used, because the radar system 400 may be set up to use Doppler processing on one range for enhanced target detection in or amidst sea clutter and longer range situational awareness with target trails on the other range.

Figure 5:
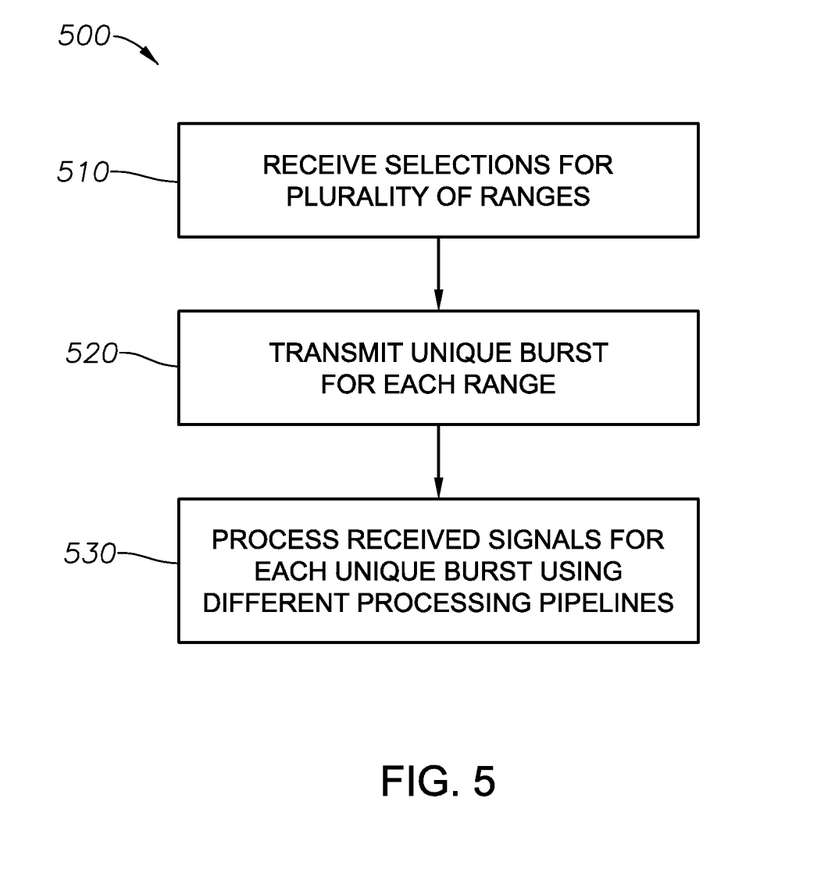
FIG. 5 illustrates a flow diagram of a method for covering multiple ranges in accordance with implementations of various techniques described herein.

FIG. 5 illustrates a flow diagram of a method 500 for covering multiple ranges in accordance with implementations of various techniques described herein. In one implementation, method 500 may be performed by one or more components, including a multi-range pulse compression radar system. It should be understood that while method 500 indicates a particular order of execution of operations, in some implementations, certain portions of the operations might be executed in a different order. Further, in some implementations, additional operations or steps may be added to the method 500. Likewise, some operations or steps may be omitted.

At block 510, the multi-range pulse compression radar system may receive selections for a plurality of ranges proximate to the system. As noted above, a range is an area within a predetermined distance from the multi-range pulse compression radar system. In one implementation, the system may receive selections for n number of ranges.

At block 520, the multi-range pulse compression radar system may transmit a unique burst for each of the selected ranges. In one implementation, for n number of ranges, the system may transmit a unique burst for each, thereby transmitting a total of n number of bursts. As noted above, the bursts may be transmitted continuously. In particular, for two bursts, the bursts may be transmitted continuously in alternating fashion without the need for additional input by an operator. For three or more bursts, the bursts may be transmitted continuously in a round-robin fashion without the need for additional input by an operator. Further, the bursts may be transmitted by the multi-range pulse compression radar system in any pattern or in any randomized manner within a dwell count.

At block 530, the multi-range pulse compression radar system may process respective received signals for each unique burst using different processing pipelines. As noted above, each processing pipeline may include a respective pulse compressor, frame combiner, and additional radar signal processing circuitry.

In sum, implementations relating to multiple ranges for pulse compression radar, described above with respect to FIGS. 1-5, may be used by a pulse compression radar system to optimally handle more than one scenario simultaneously. For example, a vessel using the multi-range pulse compression radar system could anticipate bad weather approaching. In such an example, one range of the system can be set up for collision avoidance (e.g., short range) and another range can be set up for weather detection (e.g., long range). Such a system can be set up to have continuous monitoring of both ranges without the need for further input by an operator.

Computing System

Figure 6:
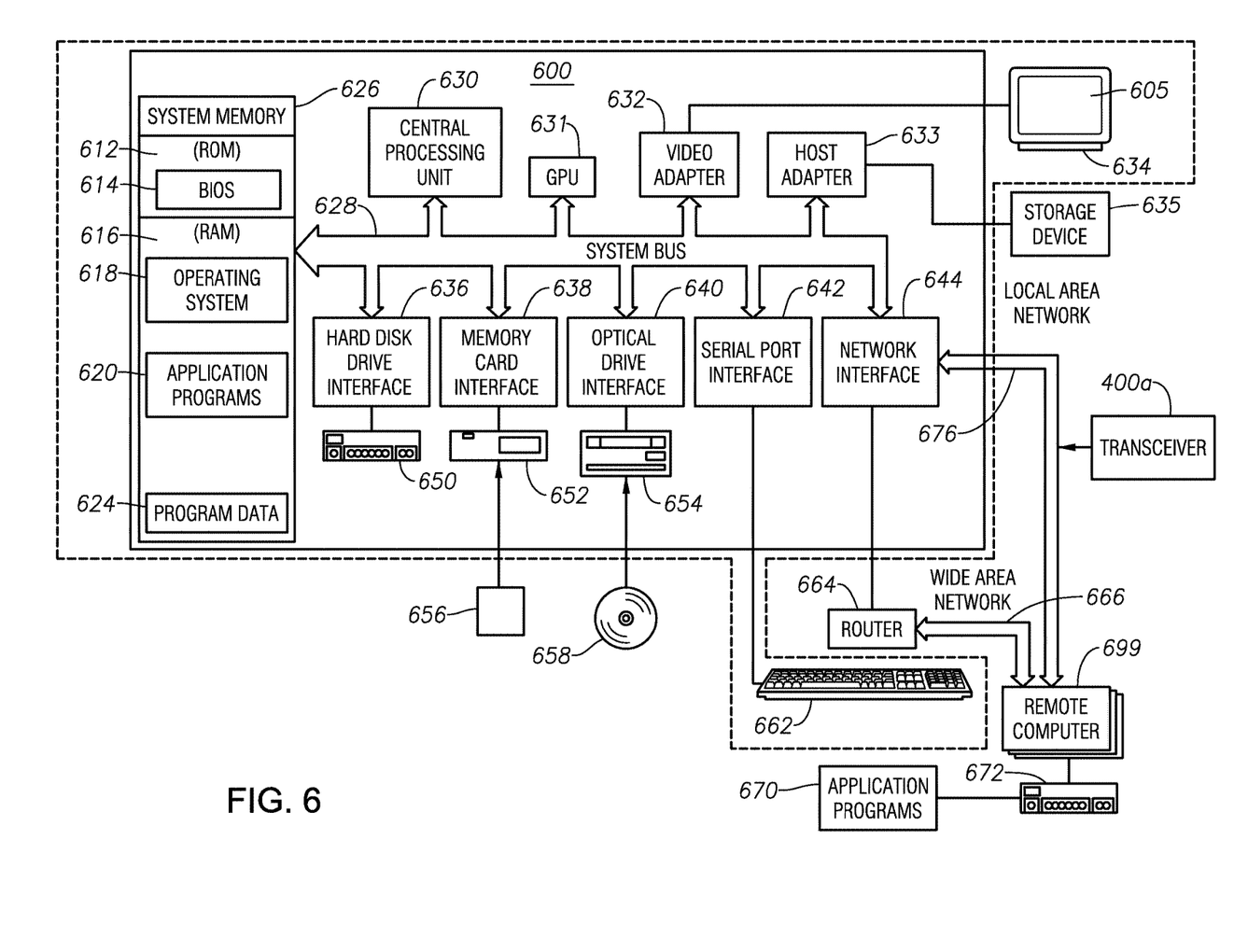
FIG. 6 illustrates a computing system in accordance with implementations of various techniques described herein.

FIG. 6 illustrates a computing system 600 in accordance with implementations of various techniques described herein. The computing system 600 may include a central processing unit (CPU) 630, a system memory 626, a graphics processing unit (GPU) 631 and a system bus 628 that couples various system components including the system memory 626 to the CPU 630. Although only one CPU 630 is illustrated in FIG. 6, it should be understood that in some implementations the computing system 600 may include more than one CPU 630.

The CPU 630 may include a microprocessor, a microcontroller, a processor, a programmable integrated circuit, or a combination thereof. The CPU 630 can comprise an off-the-shelf processor such as a Reduced Instruction Set Computer (RISC), or a Microprocessor without Interlocked Pipeline Stages (MIPS) processor, or a combination thereof. The CPU 630 may also include a proprietary processor.

The GPU 631 may be a microprocessor specifically designed to manipulate and implement computer graphics. The CPU 630 may offload work to the GPU 631. The GPU 631 may have its own graphics memory, and/or may have access to a portion of the system memory 626. As with the CPU 630, the GPU 631 may include one or more processing units, and each processing unit may include one or more cores.

The CPU 630 may provide output data to a GPU 631. The GPU 631 may generate graphical user interfaces that present the output data. The GPU 631 may also provide objects, such as menus, in the graphical user interface. A user may provide inputs by interacting with the objects. The GPU 631 may receive the inputs from interaction with the objects and provide the inputs to the CPU 630. A video adapter 632 may be provided to convert graphical data into signals for a monitor 634. The monitor 634 includes a screen 605. In certain implementations, the screen 605 may be sensitive to touching by a finger. In other implementations, the screen 605 may be sensitive to the body heat from the finger, a stylus, or responsive to a mouse. Additionally, in certain implementations, the screen may have the capability of displaying more than one plan position indicator (PPI).

The system bus 628 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 626 may include a read only memory (ROM) 612 and a random access memory (RAM) 616. A basic input/output system (BIOS) 614, containing the basic routines that help transfer information between elements within the computing system 600, such as during start-up, may be stored in the ROM 612.

The computing system 600 may further include a hard disk drive interface 636 for reading from and writing to a hard disk 650, a memory card reader 652 for reading from and writing to a removable memory card 656, and an optical disk drive 654 for reading from and writing to a removable optical disk 658, such as a CD ROM or other optical media. The hard disk 650, the memory card reader 652, and the optical disk drive 654 may be connected to the system bus 628 by a hard disk drive interface 636, a memory card reader interface 638, and an optical drive interface 640, respectively. The drives and their associated computer-readable media may provide nonvolatile storage of computer-readable instructions, data structures, program modules and other data for the computing system 600.

Although the computing system 600 is described herein as having a hard disk, a removable memory card 656 and a removable optical disk 658, it should be appreciated by those skilled in the art that the computing system 600 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 600. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 600 may also include a host adapter 633 that connects to a storage device 635 via a small computer system interface (SCSI) bus, a Fiber Channel bus, an eSATA bus, or using any other applicable computer bus interface.

The computing system 600 can also be connected to a router 664 to establish a wide area network (WAN) 666 with one or more remote computers 674. The router 664 may be connected to the system bus 628 via a network interface 644. The remote computers 674 can also include hard disks 672 that store application programs 670.

In another implementation, the computing system 600 may also connect to the remote computers 674 via local area network (LAN) 676 or the WAN 666. When using a LAN networking environment, the computing system 600 may be connected to the LAN 676 through the network interface or adapter 644. The LAN 676 may be implemented via a wired connection or a wireless connection. The LAN 676 may be implemented using Wi-Fi™ technology, cellular technology, Bluetooth™ technology, satellite technology, or any other implementation known to those skilled in the art. The network interface 644 may also utilize remote access technologies (e.g., Remote Access Service (RAS), Virtual Private Networking (VPN), Secure Socket Layer (SSL), Layer 6 Tunneling (L2T), or any other suitable protocol). These remote access technologies may be implemented in connection with the remote computers 674. It will be appreciated that the network connections shown are exemplary and other means of establishing a communications link between the computer systems may be used.

A number of program modules may be stored on the hard disk 650, memory card 656, optical disk 658, ROM 612 or RAM 616, including an operating system 618, one or more application programs 620, and program data 624. In certain implementations, the hard disk 650 may store a database system. The database system could include, for example, recorded points. The application programs 620 may include various mobile applications ("apps") and other applications configured to perform various methods and techniques described herein. The operating system 618 may be any suitable operating system that may control the operation of a networked personal or server computer.

A user may enter commands and information into the computing system 600 through input devices such as buttons 662, which may be physical buttons, virtual buttons, or combinations thereof. Other input devices may include a microphone, a mouse, or the like (not shown). These and other input devices may be connected to the CPU 630 through a serial port interface 642 coupled to system bus 628, but may be connected by other interfaces, such as a parallel port, game port or a universal serial bus (USB).

Certain implementations may be configured to be connected to the transceiver section 400a of a multi-range pulse compression radar system 400. In one implementation, the one or more application programs 620 or 670 stored in the computer-readable media can include a plurality of instructions that when executed by a processing unit, such as a CPU 630, cause the computing system to perform any of the techniques, or portions thereof, that are described herein.

The discussion of the present disclosure is directed to certain specific implementations. It should be understood that the discussion of the present disclosure is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of the implementations and combinations of elements of different implementations within the scope of the claims. It should be appreciated that in the development of any such implementation, as in any engineering or design project, numerous implementation-specific decisions should be made to achieve a developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure. Nothing in this application should be considered critical or essential to the claimed subject matter unless explicitly indicated as being "critical" or "essential."

Reference has been made in detail to various implementations, examples of which are illustrated in the accompanying drawings and figures. In the following detailed description, numerous specific details are set forth to provide a thorough understanding of the present disclosure. However, the present disclosure may be practiced without these specific details. In other instances, well-known methods, procedures, components, circuits and networks have not been described in detail so as not to unnecessarily obscure aspects of the embodiments.

It should also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations and is not intended to limit the present disclosure. As used in the description of the present disclosure and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   selecting at least a first range and a second range from a plurality of ranges;
   transmitting a first burst for the first range using a pulse compression radar system, wherein the first burst comprises one or more transmission frames, wherein each of the one or more transmission frames comprises a first pulse signal and a time delay for reception of the first pulse signal;
   transmitting a second burst for the second range using the pulse compression radar system after transmitting the first burst, wherein the second burst comprises one or more transmission frames, wherein each of the one or more transmission frames comprises a second pulse and a time delay for reception of the second pulse signal; and
   repeating transmissions of the first burst and the second burst using the pulse compression radar system in an alternating format.

2. The method of claim 1, further comprising transmitting the first burst and the second burst each at different azimuth angles of an antenna of the pulse compression radar system.

3. The method of claim 1, further comprising:
   selecting a third range from the plurality of ranges; and
   transmitting a third burst for the third range using the pulse compression radar system after transmitting the second burst and prior to repeating the transmission of the first burst, wherein the third burst comprises one or more transmission frames, wherein each of the one or more transmission frames comprises a third pulse signal and a time delay for reception of the third pulse signal.

4. The method of claim 3, further comprising repeating transmissions of the first burst, the second burst, and the third burst in a round-robin format.

5. The method of claim 1, wherein the first range and the second range respectively represent an area proximate to the pulse compression radar system.

6. The method of claim 1, wherein the first range is longer than the second range, and wherein the first burst is composed of a greater number of transmission frames than the second burst.

7. The method of claim 1, wherein the one or more first pulse signals and the one or more second pulse signals respectively comprise one or more chirp signals.

8. The method of claim 3, further comprising:
processing one or more received signals corresponding to the first burst using a first processing pipeline of the pulse compression radar system; and
processing one or more received signals corresponding to the second burst using a second processing pipeline of the pulse compression radar system.

9. The method of claim 8, further comprising determining one or more distances of objects proximate to the pulse compression radar system based on the one or more received signals corresponding to the first burst and the one or more received signals corresponding to the second burst.

10. The method of claim 8, wherein processing the one or more received signals corresponding to the first burst using the first processing pipeline comprises:
performing a pulse compression on the one or more received signals corresponding to the first burst to generate a compression signal; and
combining the compression signal for each of the one or more transmission frames of the first burst into a contiguous data set.

11. The method of claim 10, wherein performing the pulse compression comprises performing a correlation on the one or more received signals corresponding to the first burst.

12. The method of claim 8, wherein processing the one or more received signals corresponding to the second burst using the second processing pipeline comprises:
performing a pulse compression on the one or more received signals corresponding to the second burst to generate a compression signal; and
combining the compression signal for each of the one or more transmission frames of the second burst into a contiguous data set.

13. The method of claim 12, wherein performing the pulse compression comprises performing a correlation on the one or more received signals corresponding to the second burst.

14. A pulse compression radar system comprising:
a user interface configured to receive a selection of at least a first range and a second range from a plurality of ranges;
a digital signal processor; and
an antenna configured to:
transmit a first burst for the first range using a pulse compression radar system, wherein the first burst comprises one or more transmission frames, wherein each of the one or more transmission frames comprises a first pulse signal and a time delay for reception of the first pulse signal;
transmit a second burst for the second range using the pulse compression radar system after transmitting the first burst, wherein the second burst comprises one or more transmission frames, wherein each of the one or more transmission frames comprises a second pulse signal and a time delay for reception of the second pulse signal; and
repeat transmissions of the first burst and the second burst in an alternating format.

15. The pulse compression radar system of claim 14, wherein the digital signal processor comprises:
a first processing pipeline configured to process one or more received signals corresponding to the first burst, comprising:
a first pulse compressor configured to perform pulse compression on the one or more received signals corresponding to the first burst to generate a first compression signal; and
a first frame combiner to combine the first compression signal for each of the one or more transmission frames of the first burst into a contiguous data set; and
a second processing pipeline configured to process one or more received signals corresponding to the second burst, comprising:
a second pulse compressor configured to perform pulse compression on the one or more received signals corresponding to the second burst to generate a second compression signal; and
a second frame combiner to combine the second compression signal for each of the one or more transmission frames of the second burst into a contiguous data set.

16. The pulse compression radar system of claim 15, wherein the first pulse compressor comprises a first correlator, and wherein the second pulse compressor comprises a second correlator.

17. A method comprising:
selecting a first range, a second range, and a third range from a plurality of ranges;
transmitting a first burst for the first range using a pulse compression radar system, wherein the first burst comprises one or more transmission frames, wherein each of the one or more transmission frames comprises a first pulse signal and a time delay for reception of the first pulse signal;
transmitting a second burst for the second range using the pulse compression radar system after transmitting the first burst, wherein the second burst comprises one or more transmission frames, wherein each of the one or more transmission frames comprises a second pulse signal and a time delay for reception of the second pulse signal;
transmitting a third burst for the third range using the pulse compression radar system after transmitting the second burst, wherein the third burst comprises one or more transmission frames, wherein each of the one or more transmission frames comprises a third pulse signal and a time delay for reception of the third pulse signal; and
repeating transmissions of the first burst, the second burst, and the third burst using the pulse compression radar system after transmitting the third burst.

18. The method of claim 17, wherein repeating transmissions of the first burst, the second burst, and the third burst comprises repeating transmissions of the first burst, the second burst, and the third burst in a round-robin format.

* * * * *